June 4, 1946.    G. A. LYON    2,401,492
WHEEL STRUCTURE
Filed Oct. 14, 1943
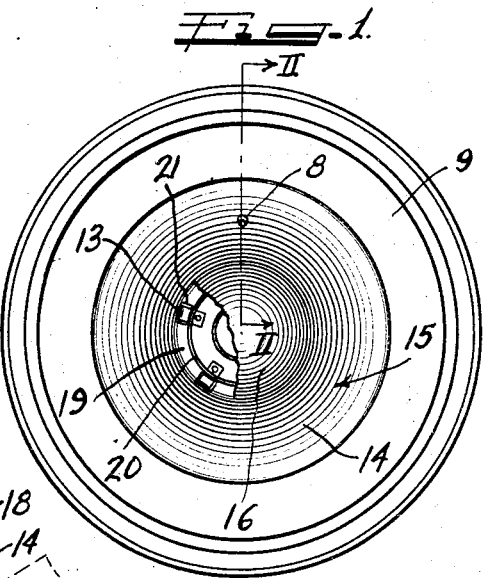
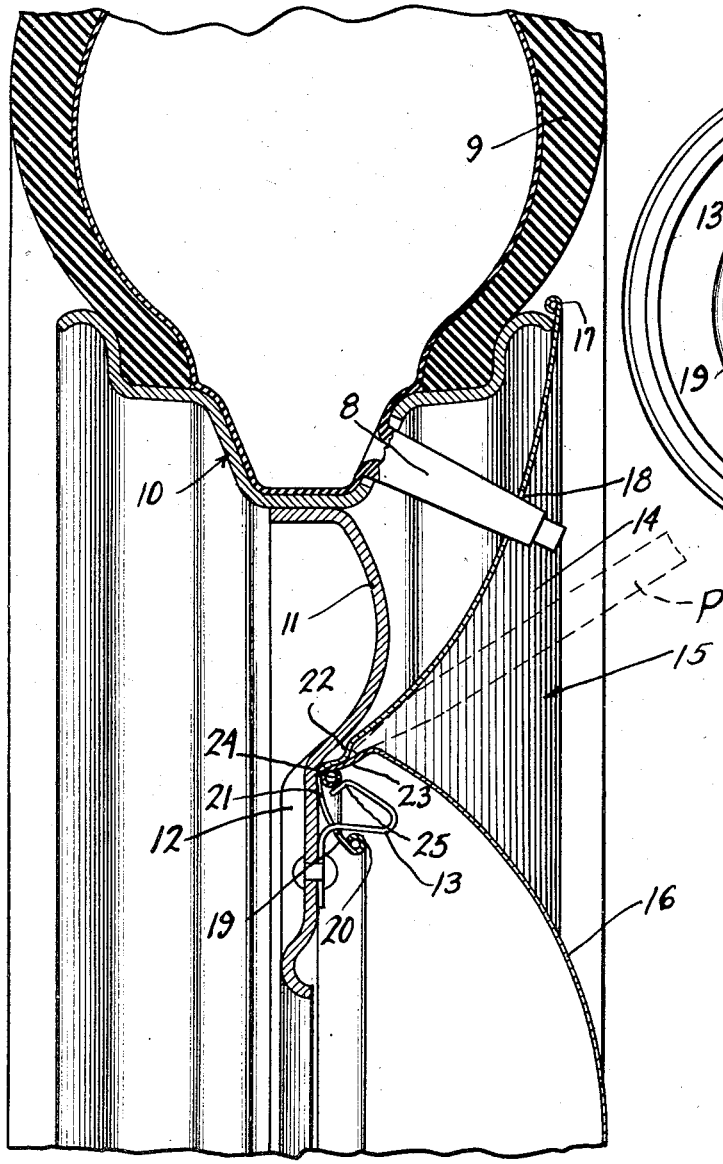
Inventor
GEORGE ALBERT LYON
by Charles W. Hills
Attys.

Patented June 4, 1946

2,401,492

UNITED STATES PATENT OFFICE 2,401,492

WHEEL STRUCTURE

George Albert Lyon, Allenhurst, N. J.

Application October 14, 1943, Serial No. 506,174

8 Claims. (Cl. 301—37)

This invention relates to a wheel structure and more particularly to a multipart cover novelly retained on a wheel.

An object of this invention is to provide an improved and simplified structure for holding a multipart cover structure on a wheel.

Another object of this invention is to provide a wheel cover structure which permits of the removal of one of the parts with facility whenever it is desired to get to the underside of that part.

Still another object of this invention is to provide a novel internesting structure for a plurality of concentric cover parts in a wheel construction.

In accordance with the general features of this invention there is provided in a wheel structure including a tire rim and body, concentric cover members disposed in nested relation on the wheel, one of these members being offset adjacent the other to provide a space between the members for the reception of the end of a pry-off tool for prying off one of the members off the wheel without releasing the other member.

Still another feature of the invention relates to the provision of retaining means for a multiple part cover structure wherein the means cooperate with nested marginal portions of the cover parts in such a manner that the means is in retaining engagement with both the parts and yet permits of the removal of one of the parts without disturbing the other part.

A still further feature of the invention relates to the provision of an annular cover part or ring having apertures in its inner margin through which spring fingers on a wheel project for retaining engagement with an edge of each of the apertures and also for detachable retaining engagement with an edge of a hub cap part positioned over the center of the ring; the retaining means serving to center the ring cover part on the wheel and also to hold that part in place during the time that the central hub cap part is being applied to or removed from the wheel.

Other objects and features of this invention will more fully appear from the following detailed description taken in connection with the accompanying drawing which illustrates a single embodiment thereof, and on which:

Figure 1 is a side elevation of a wheel structure embodying the features of this invention with the central hub cap part partly broken away to show the position of the retaining means therebehind; and Figure 2 is an enlarged fragmentary cross-sectional view taken on the line II—II of Figure 1 looking in the direction indicated by the arrows showing how the nested cover parts co-operate with the common retaining means on the wheel; the dotted lines showing a pry-off tool applied to the cover.

As shown on the drawing:

The reference character 10 designates generally a multiflange drop-center type of conventional tire rim which is adapted to support in the usual way a pneumatic tube tire 9 equipped with the usual valve stem 8 extending through an aperture in one of the flanges of the tire rim.

The tire rim member is attached in any suitable or conventional manner to a central load bearing or body member sometimes referred to as a spider and which is designated generally by the reference character 11. This spider is usually made from a metallic stamping and has a central depressed section 12 provided with the usual wheel fastening bolts (not shown) for attaching the wheel to a support on the axle or the like. As is well known, such bolts or cap screws must be accessible when it is desired to remove the wheel from its support as in the case of a flat tire or the like.

Attached to the depressed central section 12 of the wheel body are a plurality of equidistantly spaced retaining elements or spring clips 13 which may be of any suitable number such, for example, as three or five, as desired. The clips illustrated are of the type now known in the art as an inverted type clip and each includes a free extremity in the form of a goose-neck or loop so formed as to exert a cam-like wedging pressure on the cover part to be retained.

Associated with the outer side of the wheel is a cover structure embodying the features of this invention designated generally by the reference character 15 and which, as shown, comprises an outer ring part 14 and a central hub cap part 16. Both parts may be made of metal or, if it is so desired, they may be made of a suitable synthetic plastic material having the requisite rigid characteristics. The outer edge of the trim ring 14 is slightly turned at 17 and is adapted to overhang the outermost edge of the tire rim 10. Also the ring is of a convex-concave cross-sectional contour such as to cause it to appear to be a continuation of the curvature of the side wall of the tire 9. By giving this ring a suitable light external finish it is possible to cause it to appear to be part of the side wall of the tire, in which case the effect is that of a much larger tire than what is actually used.

For illustration, if the external surface of the member 14 is painted white, it appears to constitute a white side wall part of a tire.

The ring 14 is apertured at 18 so that the valve stem may extend therethrough for the purpose of being accessible.

The inner marginal portion of the ring 14 is offset inwardly into a curved flange 19 which terminates in a turned edge 20. This flange is provided with a plurality of apertures 21 corresponding in number to the number of spring clips, through each of which a spring clip 13 extends. The radially inner leg of the spring clip is positioned for retaining contact with the radially inner edge of the corresponding aperture as shown in Figure 2.

The inner marginal portion of the ring 14 also has an offset shoulder 22 which causes the ring at the locale of the offset to be spaced from the skirt 23 of the hub cap 15. This space is expressly provided for the purpose of permitting the blunt end of a pry-off tool such as the tool P to be inserted therein in the prying of the hub cap out of retained engagement with the spring clips 13.

The inner marginal edge of the skirt 23 is formed into a bead turned at 24 which is seated against the offset flange 19 of the ring part 14 axially inwardly of the offset shoulder 22. This turned edge 24 is adapted to be retainingly engaged and wedged by the outermost turned extremity 25 of the clip 13 tightly against the offset flange 19 of the ring 14 and in that way the hub cap serves to clamp the ring against the wheel.

By reason of the use of the so-called inverted type of spring clip, the hub cap 15 may be easily pressed axially into retained engagement with the turned extremities of the clips but is more difficult to remove than to apply. In other words, the spring clips 13 are of the type that permit of an easy-on hard-off operation.

Since the inner turned edge 24 of the hub cap 15 is yieldably supported on the resilient free extremities 25 of the clips 13, it is of course apparent that cushioned engagement is provided between the clips and both cover members whereby both cover members are resiliently held against the wheel body member 11 inside of the depressed section 12 adjacent the medial plane of the wheel.

Furthermore, by reason of the fact that the radially innermost legs of each of the clips 13 contact the inner edges of the apertures 21 in the inner flange 19 of the ring 14, the clips serve to center the ring and also to retain the ring in position while the hub cap is being removed from or applied to the wheel. It is of course further evident that since the clips extend through openings 21 in the ring part 14, they prevent turning of the ring part on the wheel.

It will be perceived from Figure 2 that the pry-off zone is in the vicinity of the spring clips so that the force is applied more directly to the clips in deflecting them and also that the offset or shoulder 22 in the ring 14 serves to act as a reinforcing rib at this pry-off zone.

I find that very excellent results may be obtained from the standpoint of enhancing the appearance of the wheel by making the ring 14 of white metal and by making the cap 16 of stainless steel. Any suitable finish may be applied to the external surface of the ring 14 and thus highly desirable contrasting colors may be obtained as between the ring 14 and the hub cap 16.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a wheel structure including a tire rim and body, concentric cover members disposed in nested relation on the wheel, one of said members being offset adjacent the other to provide a space between said members for the reception of the end of a pry-off tool for prying one of said members off the wheel without releasing the other member, and means on the wheel body adjacent said offset for retaining the cover members on the wheel comprising a plurality of projections extending through apertures in one of said members and in retaining contact with each of said cover members.

2. In a wheel structure including a tire rim and body, concentric cover members disposed in nested relation on the wheel, one of said members being offset adjacent the other to provide a space between said members for the reception of the end of a pry-off tool for prying one of said members off the wheel without releasing the other member, and means on the wheel body adjacent said offset for retaining the cover members on the wheel comprising a plurality of projections extending through apertures in one of said members and in retaining contact with each of said cover members, said retaining means comprising a plurality of spring clips, each of which has a resilient loop extremity with one leg of the loop in contact with one of said members and the other leg in contact with the other member.

3. In a wheel structure including a tire rim and body, concentric cover members disposed in nested relation on the wheel, one of said members comprising a ring and the other member comprising a hub cap with the outer margin of the hub cap positioned for clamping co-operation against the inner margin of the ring, and retaining means on the wheel body for said cover member comprising a plurality of spring clips, each of which has a resilient loop extremity with one leg of the loop in contact with the inner margin of the ring and with the other leg in contact with the outer margin of the hub cap.

4. In a wheel structure including a tire rim and body, concentric cover members disposed in nested relation on the wheel, one of said members comprising a ring and the other member comprising a hub cap with the outer margin of the hub cap positioned for clamping co-operation against the inner margin of the ring, and retaining means on the wheel body for said cover member comprising a plurality of spring clips, each of which has a resilient loop extremity with one leg of the loop in contact with the inner margin of the ring and with the other leg in contact with the outer margin of the hub cap, said clips extending through apertures in the inner margin of the ring cover member to a position inside of the hub cap.

5. In a wheel structure including a tire rim and body, cover members disposed in nested relation on the wheel comprising an outer ring and a central hub cap seated on the inner margin of the ring, retaining means for the cover members mounted on the wheel body and comprising a plurality of projections extending through apertures in one of said members into the interior of the hub cap and in retaining contact with each of said members inside of the hub cap, said members being slightly spaced directly radially outwardly of the retaining means to receive the end of a pry off tool for applying releasing pressure substantially directly to said retaining means to release said hub cap from retained engagement with the wheel body.

6. In a wheel structure including a tire rim and body, cover members disposed in nested relation on the wheel comprising an outer ring and a central hub cap seated on the inner margin of the ring, retaining means for the cover members mounted on the wheel body and comprising a plurality of projections extending through apertures in one of said members and in retaining contact with each of said members inside of the hub cap, said retaining means comprising a plurality of spring clips, each of which includes a radially outwardly extending loop portion turned back upon the main body of the ring with the outermost extremity thereof in retaining engagement with an outer marginal edge of the hub cap and with the radially inner portion of the loop in retaining engagement with an inner marginal portion of the ring cover member.

7. In a wheel structure including a tire rim and body member, an outer circular cover extending over an outer side of the wheel and having an offset shouldered inner portion disposed over the body member, a hub cap disposed in the center of said cover having an inturned outer flange co-operable with said shoulder portion, and spring clips on the body member extending through apertures in said shouldered inner portion, each including a resilient free turned outer portion over which said hub cap inturned flange is adapted to be pressed into retained position on the wheel and in clamping co-operation with said cover shoulder portion to clamp detachably the cover on the wheel, said cover being slightly spaced from said flange adjacent said shoulder portion to define an opening for receiving the edge of a pry-off tool for applying an ejecting pry-off force directly to the outer flange of said hub cap.

8. In a wheel structure including a tire rim and body member, an outer circular cover extending over an outer side of the wheel and having an offset shouldered inner portion disposed over the body member, a hub cap disposed in the center of said cover having an inturned outer flange co-operable with said shoulder portion, and spring clips on the body member extending through apertures in said shouldered inner portion, each including a resilient free turned outer portion over which said hub cap inturned flange is adapted to be pressed into retained position on the wheel and in clamping co-operation with said cover shoulder portion to clamp detachably the cover on the wheel, said cover being slightly spaced from said flange adjacent said shoulder portion to define an opening for receiving the edge of a pry-off tool for applying an ejecting pry-off force directly to the outer flange of said hub cap, each of said spring clips also including a portion for engaging an edge of the aperture in the shouldered inner portion of the cover whereby said clips serve to center said cover and also to retain the cover on the wheel after the ejection of the hub cap therefrom.

GEORGE ALBERT LYON.